(12) United States Patent
Lin et al.

(10) Patent No.: US 10,853,525 B2
(45) Date of Patent: Dec. 1, 2020

(54) HACK-PROOF SECURITY KEYBOARD (71) Applicant: Dell Products, L.P., Round Rock, TX (US)

(72) Inventors: Yong-Teng Lin, Yilan (TW); Geroncio Ong Tan, Austin, TX (US); Timothy C. Shaw, Austin, TX (US); No-Hua Chuang, Taipei (TW); Erh-Chieh Chang, Taipei (TW); Chih-Hao Chen, New Taipei (TW); Wen-Pin Huang, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 291 days.

(21) Appl. No.: 15/953,718

(22) Filed: Apr. 16, 2018

(65) Prior Publication Data
US 2019/0318134 A1    Oct. 17, 2019

(51) Int. Cl.
*G06F 21/00*    (2013.01)
*G06F 21/83*    (2013.01)
(Continued)

(52) U.S. Cl.
CPC ............ *G06F 21/83* (2013.01); *G06F 3/0202* (2013.01); *G06F 3/0227* (2013.01); *G06F 21/71* (2013.01);
(Continued)

(58) Field of Classification Search
CPC ........ G06F 21/83; G06F 21/71; G06F 3/0227; G06F 3/0202; H01H 13/807; H01H 2300/052; H01H 13/703; H01H 2225/004; H01H 2227/022; H01H 2201/024; H01H 2201/026; H01H 13/785
See application file for complete search history.

(56) References Cited

U.S. PATENT DOCUMENTS 5,890,997 A *  4/1999  Roth ..................... A63B 71/06
                                                 482/8
6,799,303 B2 * 9/2004  Blumberg ......... H01L 21/02203
                                                 715/257

(Continued)

OTHER PUBLICATIONS

Sapra et al., "Circumventing keyloggers and screendumps", 2013 8th International Conference on Malicious and Unwanted Software: "The Americas" (MALWARE), Date of Conference: Oct. 22-24 (Year: 2013).*

*Primary Examiner* — Morshed Mehedi
(74) *Attorney, Agent, or Firm* — Fogarty LLP (57) ABSTRACT

Systems and methods for a hack-proof security keyboard are described. In some embodiments, a keyboard module may include a first circuit configured to detect activation of a plurality of keys and a second circuit configured to detect activation of a subset of the plurality of keys, where the second circuit overlies the first circuit. In other embodiments, a method may include detecting an electrical signal received from a secondary membrane of a keyboard, where the keyboard includes a primary membrane configured to detect individual activation of any of a plurality of keys, and where the secondary membrane is configured to output the electrical signal in response to concurrent activation of a subset of the plurality of keys. The method may also include performing a selected action in response to the detection.

20 Claims, 4 Drawing Sheets

(51) Int. Cl.
*G06F 21/71* (2013.01)
*G06F 3/02* (2006.01)
*H01H 13/807* (2006.01)
H01H 13/703 (2006.01)
H01H 13/785 (2006.01)

(52) U.S. Cl.
CPC ......... *H01H 13/807* (2013.01); *H01H 13/703* (2013.01); *H01H 13/785* (2013.01); *H01H 2201/024* (2013.01); *H01H 2201/026* (2013.01); *H01H 2225/004* (2013.01); *H01H 2227/022* (2013.01); *H01H 2300/052* (2013.01)

(56) References Cited

U.S. PATENT DOCUMENTS

| | | | | |
|---|---|---|---|---|
| 8,407,603 | B2* | 3/2013 | Christie | G06F 3/04883 |
| | | | | 715/751 |
| 9,122,871 | B2* | 9/2015 | Bellahcene | G06F 21/554 |
| 2003/0048256 | A1* | 3/2003 | Salmon | G06F 1/1613 |
| | | | | 345/168 |
| 2008/0150905 | A1* | 6/2008 | Grivna | G06F 3/016 |
| | | | | 345/173 |
| 2011/0279223 | A1* | 11/2011 | Hatambeiki | G06F 3/0346 |
| | | | | 340/4.3 |
| 2012/0193203 | A1* | 8/2012 | Jiang | G06F 3/0202 |
| | | | | 200/5 A |
| 2017/0235404 | A1* | 8/2017 | Grivna | G06F 3/0416 |
| | | | | 345/174 |
| 2018/0218859 | A1* | 8/2018 | Ligtenberg | H01H 13/85 |
| 2019/0179438 | A1* | 6/2019 | Benkley, III | G06K 9/00013 |
| 2019/0258322 | A1* | 8/2019 | Tangen | G06F 1/1626 |

* cited by examiner

HACK-PROOF SECURITY KEYBOARD

FIELD

The present disclosure generally relates to electronic devices, and, more particularly, to a hack-proof security keyboard.

BACKGROUND

As the value and use of information continues to increase, individuals and businesses seek new ways to process and store that information. One available option is to employ Information Handling Systems (IHSs). An IHS generally processes, compiles, stores, and/or communicates information or data for business, personal, or other purposes; thereby allowing users to take advantage of the value of the information.

Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as, for example, financial transaction processing, airline reservations, enterprise data storage, or global communications. In addition, IHSs may include a variety of hardware and software components that may be configured to process, store, and communicate information, and may include one or more computer systems, data storage systems, and networking systems.

Generally, an IHS may include one or more input devices through which a user can interact with it. A keyboard, for example, is an apparatus that uses an arrangement of buttons or keys configured to act as mechanical levers and/or electronic switches. In various implementations, a keyboard has symbols, such as numerals and/or characters, engraved or printed on its keys. Each keystroke causes a corresponding symbol to be received by the IHS.

SUMMARY

Embodiments of systems and methods for a hack-proof security keyboard are described. In an illustrative, non-limiting embodiment, a keyboard module may include a first circuit configured to detect activation of a plurality of keys and a second circuit configured to detect activation of a subset of the plurality of keys, where the second circuit overlies the first circuit. The first circuit may include a row trace layer, a column trace layer, and a spacing layer between the row trace layer and the column trace layer. The first circuit may be coupled to a metal plate via a first insulating layer, and the second circuit may be coupled to the first circuit via a second insulating layer.

In some implementations, the second circuit may include an input trace layer, an output trace layer, and another spacing layer between the input trace layer and the output trace layer. Alternatively, the second circuit may include a single conductive trace layer. For example, the single conductive trace layer may include a silver trace portion and a carbon trace portion overlying the silver trace portion. The single conductive trace layer may form a gap under each key of the subset of keys, and each of the subset of keys may include a conductive dome configured to close a corresponding gap. For example, the conductive dome may be a carbon dome.

The second circuit may couple each of a plurality of electrical switches in series, where each one of the plurality of switches corresponds to one key of the subset keys, and where concurrent activation of the subset of keys causes the second circuit to output a selected electrical signal. The selected electrical signal may be configured to cause a reset or recovery operation of an Information Handling System (IHS) independently of any keystroke detection by the first circuit.

In some implementations, a third circuit may be configured to detect activation of another subset of the plurality of keys, where the third circuit overlies the first or second matrices, where the third circuit couples each of another plurality of electrical switches in series with respect to each other, and where concurrent activation of the other subset of keys causes the third circuit to output another electrical signal independently of any keystroke detection by any of the first or second matrices.

In another illustrative, non-limiting embodiment, an IHS may include: a processor, an embedded controller coupled to the processor, and a keyboard coupled to the embedded controller, the keyboard comprising: a plurality of keys; a primary membrane configured to detect activation of any of the plurality of keys; and a secondary membrane configured to detect concurrent activation of a subset of the plurality of keys.

The primary membrane may include a row trace layer, a column trace layer, and a spacing layer between the row trace layer and the column trace layer. The secondary membrane may include a conductive trace layer having a respective gap under each key of the subset of keys, where each of the subset of keys includes a conductive dome. In some cases, the conductive trace layer may include a silver trace portion and a carbon trace portion overlying the silver trace portion, and the conductive dome may be a carbon dome.

The secondary membrane may couple each of a plurality of electrical switches in series, such that each one of the plurality of switches corresponds to one key of the subset keys, and where concurrent activation of the subset of keys causes the secondary membrane to output an electrical signal. For example, the electrical signal may trigger a predefined operation.

In another illustrative, non-limiting embodiment, a method may include detecting an electrical signal received from a secondary membrane of a keyboard, where the keyboard includes a primary membrane configured to detect individual activation of any of a plurality of keys, and where the secondary membrane is configured to output the electrical signal in response to concurrent activation of a subset of the plurality of keys; and performing a selected action in response to the detection. For example, the selected action may include a hardware reset operation. Additionally, or alternatively, the selected action may include a software recovery operation.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

A keyboard has keys (e.g., plastic, rubber, etc.) laid over a matrix circuit of rows and columns. The matrix circuit includes a switch, or a gap, at each row/column intersection. In operation, a controller sequentially sends electric signals to each row, while scanning all columns for a return signal. In their default configuration, every switch in the circuit is open—i.e., non-conductive—and therefore there is no return signal. When a key is pushed down, however, the switch located at that respective row/column intersection of the matrix circuit is then closed—i.e., made conductive. In response, the controller detects the keypress action (as a voltage or current), as well as the identity of the key, for example, by noting the row and column combination of the activated portion of the matrix circuit.

In various implementations, Information Handling Systems (IHSs) may have one or more modes of operation that can be triggered, or otherwise entered into, in response to a special key press, key sequence, or key combination. For example, an IHS may have a recovery, remediation, and/or support mode (referred to herein as a "recovery mode(s)") that relies on a particular keyboard input (referred to herein as a "recovery keystroke(s)") to instruct an Embedded Controller (EC) or other chip within the IHS to enter such mode. There are various situations, however, where a recovery keystroke cannot be provided using a conventional keyboard.

For example, in some cases an IHS may be infected with a software virus or other malware that prevents the EC from receiving certain (or any) conventional keyboard inputs. In those scenarios, despite the user pressing the correct key(s) on a keyboard, the IHS cannot enter recovery mode. To address this type of problem, it is possible to add a controller configured to isolate itself from the IHS upon a special key sequence, and to scan the matrix circuit locally. However, this approach increases design complexity and cost, and reduces available Printed Circuit Board (PCB) space. Moreover, in conventional IHS implementations powered by internal or non-replaceable batteries, when an IHS's software or Operating System (OS) hangs or freezes, often the only available recourse (in the absence of a hardware reset) is to let the battery drain, which can take several hours.

To address these, and other problems, systems and methods described herein provide low-cost, hack-proof, hardware recovery/reset solutions which may be applicable for example, in situations where the physical presence of the user at the IHS is required and/or desirable (to activate keystrokes).

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

Figure 1:
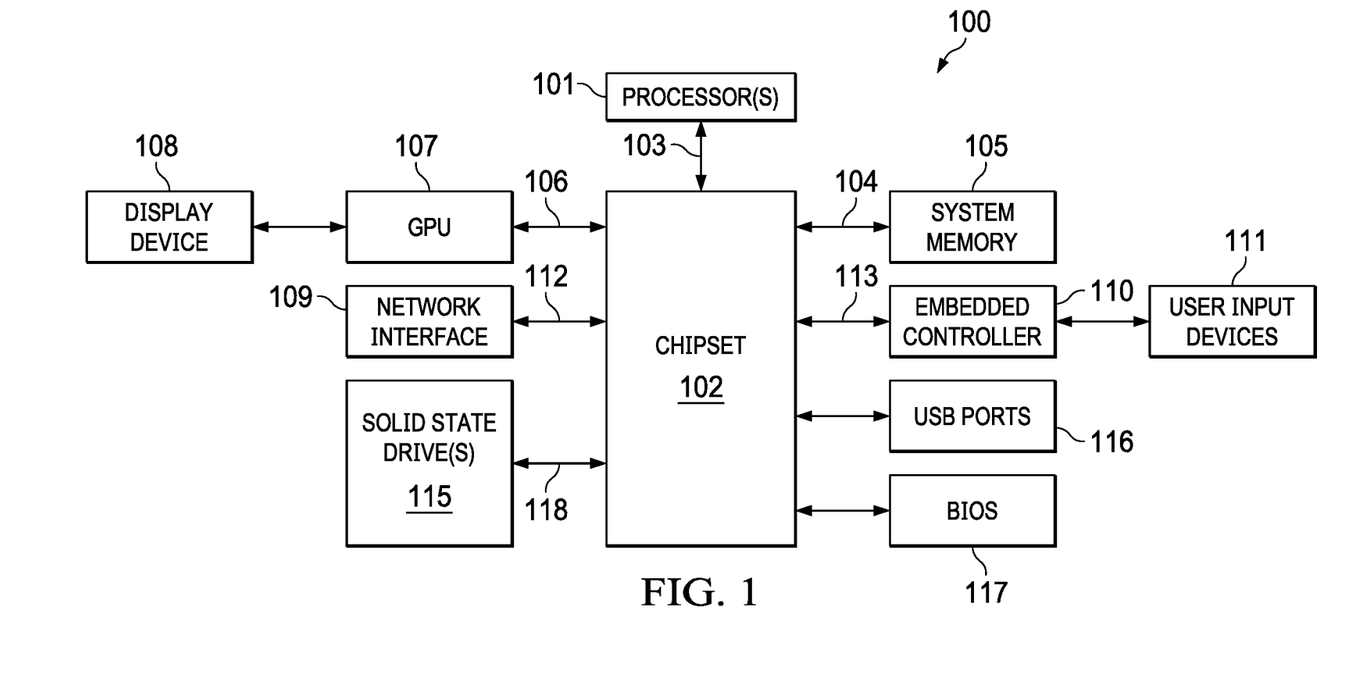
FIG. 1 is a block diagram of examples of components of an Information Handling System (IHS) according to some embodiments.

FIG. 1 illustrates example components of IHS 100. As shown, IHS 100 includes one or more processors 101. In various embodiments, IHS 100 may be a single-processor system including one processor 101, or a multi-processor system including two or more processors 101. Processor(s) 101 may include any processor capable of executing program instructions, such as any general-purpose or embedded processor implementing any of a variety of Instruction Set Architectures (ISAs).

IHS 100 comprises chipset 102 that may include one or more integrated circuits that are connected to processor(s) 101. In certain embodiments, chipset 102 may utilize QPI (QuickPath Interconnect) bus 103 for communicating with processor(s) 101. Chipset 102 provides processor(s) 101 with access to a variety of resources. For instance, chipset 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), dynamic RAM (DRAM) or nonvolatile/Flash-type memory.

Chipset 102 may also provide processor(s) 101 with access to Graphics Processing Unit (GPU) 107. In certain embodiments, GPU 107 may part of one or more video or graphics cards that installed as components of IHS 100. GPU 107 may be coupled to chipset 102 via graphics bus 106, such as an AGP (Accelerated Graphics Port) bus or a PCIe (Peripheral Component Interconnect Express) bus. In certain embodiments, GPU 107 generates a video display signal and provides it to display device 108 for visual reproduction.

In certain embodiments, chipset 102 may also provide chipset 102 and/or processor(s) 101 with access to one or more user input devices 111. For instance, chipset 102 may be coupled to embedded controller (EC) 110 that provides interfaces for a variety of user input devices 111. In some cases, chipset 102 may be coupled to EC 110 via Low Pin Count (LPC) bus 113. Examples of user input devices 111 include, but are not limited to: keyboards, keypads, mice, trackpads, biometric devices, voice or optical recognition devices, etc.—which may interface with EC 110 through wired or wireless connections.

Other resources may also be coupled to processor(s) 101 of IHS 100 through chipset 102. In certain embodiments, chipset 102 may be coupled to network interface 109, such as provided by a Network Interface Controller (NIC) that is coupled to IHS 100. For example, network interface 109 may be coupled to chipset 102 via PCIe bus 112. Moreover, network interface 109 may also support communication over various wired and/or wireless networks and protocols (e.g., Wi-Fi, Bluetooth, etc.). In certain embodiments, chipset 102 may also provide access to one or more Universal Serial Bus (USB) ports 116.

Chipset 102 also provides access to one or more solid state storage devices 115 using PCIe bus interface connection 118. In certain embodiments, chipset 102 may also provide access to other types of storage devices. For instance, in addition to solid state storage device 115, IHS 100 may also utilize one or more magnetic disk storage devices, or other types of the storage devices such as optical drive(s) or a removable-media drive. In various embodiments, solid state storage device 115 may be integral to IHS 100, or may be located remotely from IHS 100.

Upon powering or restarting IHS 100, processor(s) 101 may utilize instructions stored in Basic Input/Output System (BIOS) or Unified Extensible Firmware Interface (UEFI) chip 117 to initialize and test hardware components coupled to IHS 100 and to load an Operating System (OS) for use by IHS 100. Generally, BIOS 117 provides an abstraction layer that allows the OS to interface with certain hardware components that utilized by IHS 100. It is through this hardware abstraction layer that software executed by the processor(s) 101 of IHS 100 is able to interface with I/O devices coupled to IHS 100.

In various embodiments, IHS 100 may not include each of the components shown in FIG. 1. Additionally, or alternatively, IHS 100 may include other components in addition to those that are shown. Furthermore, some components that are represented as separately may, in other embodiments, be integrated with other components. For example, in various implementations, all or a portion of the functionality provided by the illustrated components may instead be provided by components integrated as a system-on-a-chip (SOC), or the like.

Figure 2:
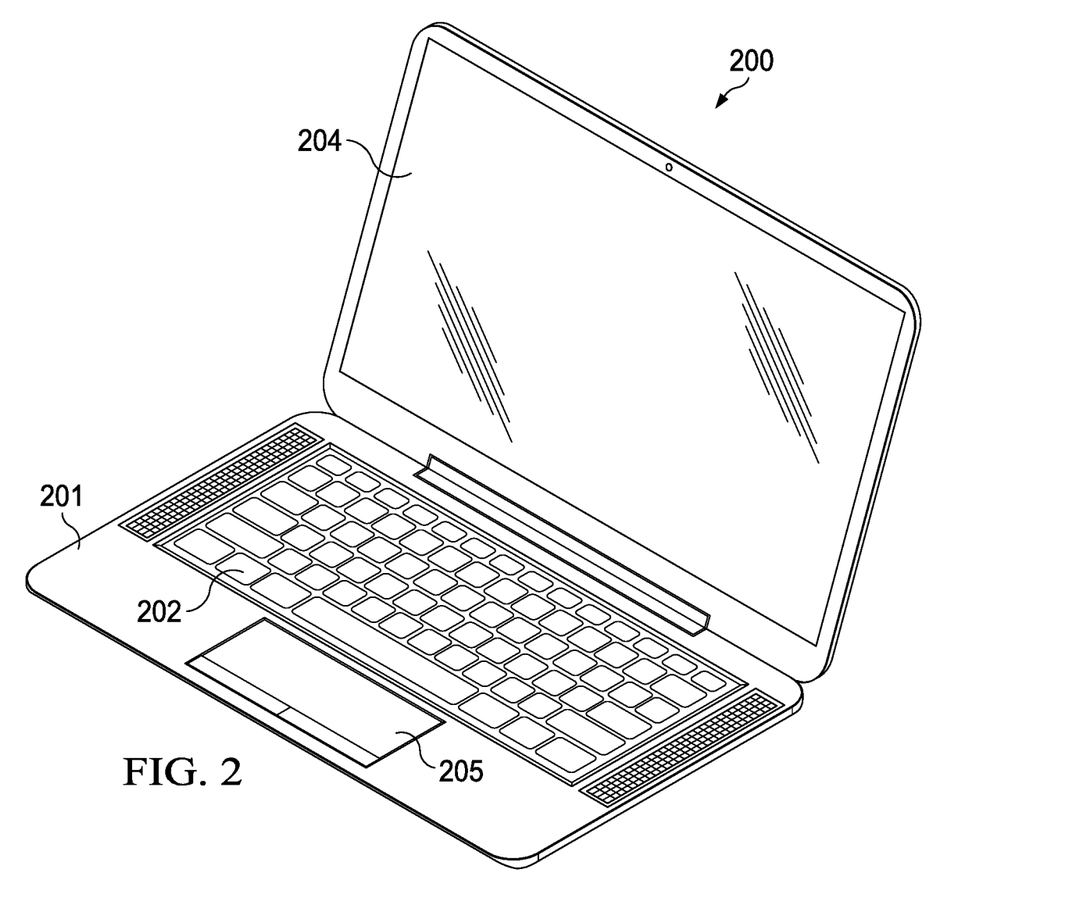
FIG. 2 is a perspective view of an example of an IHS according to some embodiments.

FIG. 2 is a perspective view of an example of IHS 200 having hack-proof security keyboard 202. In various embodiments, IHS 200 may include any number of internal and/or external components 100, as described in FIG. 1. As shown, IHS 200 includes base or bottom portion 201 fastened to lid or top portion 204. In many implementations, top portion 204 may be pivot-ably coupled to base portion 201, such that top portion 204 may be moved between a closed position and an open position with respect to base portion 201.

In some cases, top portion 204 may include a display (e.g., as monitor 108) configured to present visual content, such as a graphical user interface, still images, video, etc. using any appropriate technology such as a liquid crystal display (LCD), organic light-emitting diode (OLED), etc. Meanwhile, base portion 201 may accommodate user input devices such as keyboard 202 and touchpad 205.

Keyboard 202 may include a plurality of keys. Each key of keyboard 202 may have a symbol imprinted thereon for identifying the key input associated with that particular key. In operation, keyboard 202 may be arranged to receive a discrete input at each key using a downward finger motion usually referred to as a "keystroke" or "keypress". Keystrokes may be converted to electrical signals by EC 110 (or a dedicated keyboard controller) which are then passed to chipset 102 and/or processor(s) 101 for evaluation and/or control.

Figure 3:
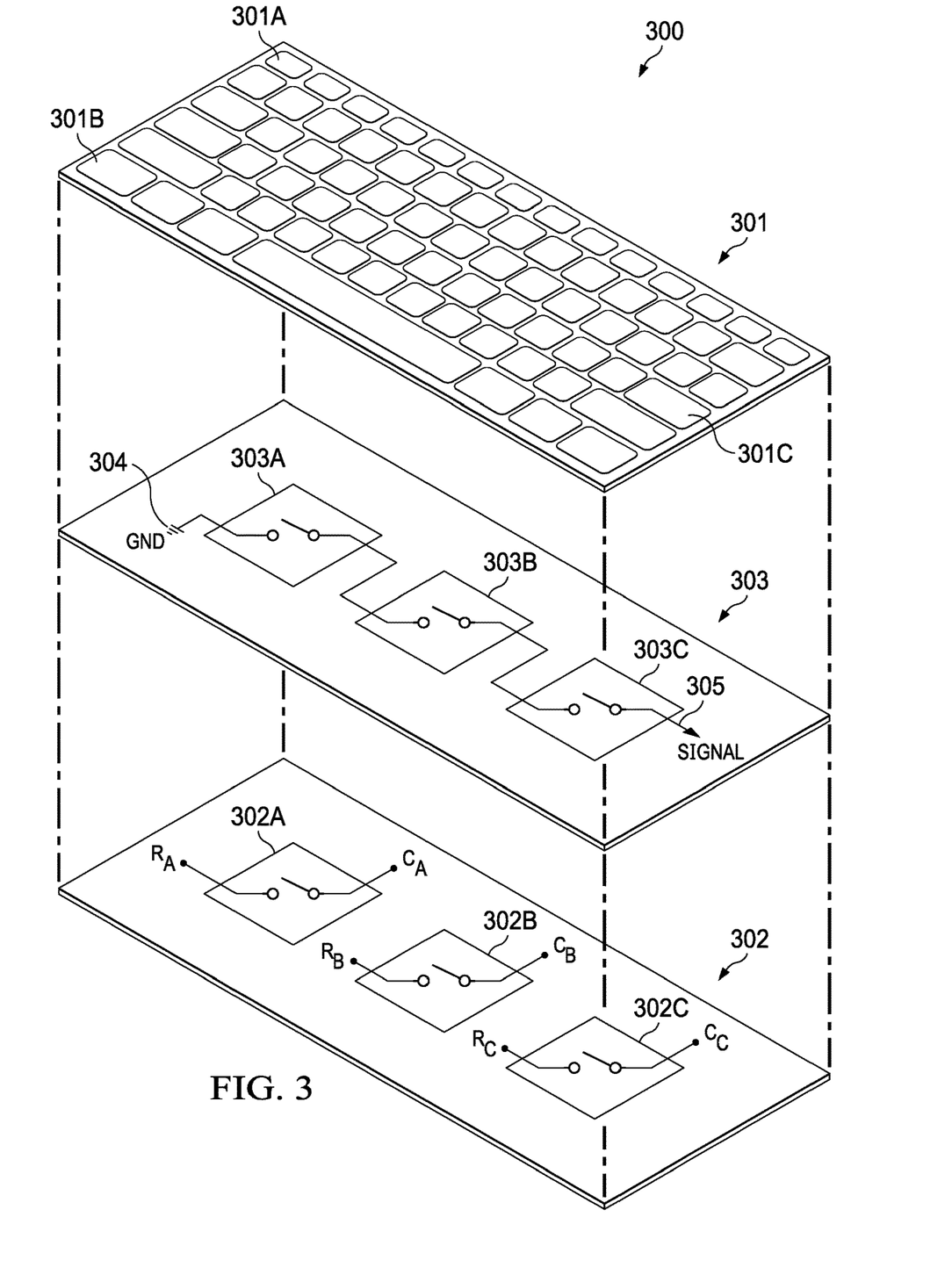
FIG. 3 is an exploded view of an example of a hack-proof security keyboard module according to some embodiments.

FIG. 3 is an exploded view of an example of hack-proof security keyboard module 300. In various embodiments, hack-proof security keyboard module 300 may be included in keyboard 202 of FIG. 2. As shown, hack-proof security keyboard module 300 comprises electromechanical layer 301, primary layer 302, and secondary layer 303 sandwiched between the other two layers. A cable or wiring (not shown) may interface electronic components within hack-proof security keyboard module 300 with EC 110 (and/or a keyboard controller).

Electromechanical layer 301 has a plurality of keys extending out of an upper surface of hack-proof security keyboard module 300 to provide selectable inputs based upon the characters associated with the keys, such as a QWERTY keyboard that provides ASCI binary code. As such, electromechanical layer 301 may further include a variety of components (e.g., membranes, lever structures, metal plates, domes, other electronic circuits, etc.) to place keys as individual caps or assembled as one part, to bias keys upward, to detect keystrokes, etc.

Primary layer 302 may include an otherwise conventional, full matrix circuit of rows (R) and columns (C) with electro-mechanical switches at each row-column intersection. In various embodiments, sixty (60) or more keys may be present in electromechanical layer 301, and therefore an equal number of electro-mechanical switches may be provided in primary layer 302, each switch located under a corresponding key. In order to facilitate explanation, it should be noted that only selected components of a full matrix circuit are illustrated in primary layer 302 in a conceptual manner, without regard for scale or actual physical location.

Upon assembly, primary layer 302 is generally co-extensive with all of the keys in electromechanical layer 301. In this simplified illustration, key 301A of electromechanical layer 301 (e.g., "ESC") rests directly atop and/or overlies switch 302A located at the intersection of row $R_A$ with column $C_A$, key 301B (e.g., "Ctrl") overlies switch 302B between row $R_B$ and column $C_B$, and key 301C (e.g., "Enter") overlies switch 302C between row $R_C$ and column $C_C$.

In contrast with primary layer 302, however, secondary layer 303 does not need to include a matrix circuit of rows and columns, and it does not need to be co-extensive with all of the keys in electromechanical layer 301. Rather, secondary layer 303 includes a plurality of switches 303A-C coupled to each other in a series configuration with a ground (GND) 304 or any other desired voltage level, depending upon the desired logic output. The actual number of switches 303A-C in secondary layer 303 may be selected based upon a number of concurrent keypresses designed constitute a recovery (or special function) keystroke; and which can be fewer than all keys available in electromechanical layer 301.

In operation, the matrix circuit of primary layer 302 may be scanned (e.g., by a keyboard controller and/or EC 110) to detect any key being individually pressed in electromechanical layer 301. In contrast, the loop circuit of secondary layer 303 detects concurrent activation of keys 301A-C without the necessity of a matrix scanning operation.

In this case, activation of keys 301A-C outputs reset or recovery signal 305 having GND voltage level 304, regardless of the operational status of EC 110. That is, even if malware affects IHS 100 such that the matrix circuit of primary layer 302 cannot effectively output a recovery keystroke indication in response to a user's concurrent activation of keys 301A-C, reset or recovery signal 305 can nonetheless be independently output from the loop circuit of secondary layer 303 to EC 110.

EC 110 may include program instructions stored in Read-Only Memory (ROM) that are immune to hacking, and that cause EC 110 to detect reset or recovery signal 305 (e.g., at an input pin or terminal). For example, in response to the detection of signal 305, EC 110 may be forced into reset. Additionally, or alternatively, EC 110 may provide a recovery keystroke indication to chipset 102 and/or processor(s) 101, thereby causing IHS 100 to initiate a recovery or support operation.

Figure 4:
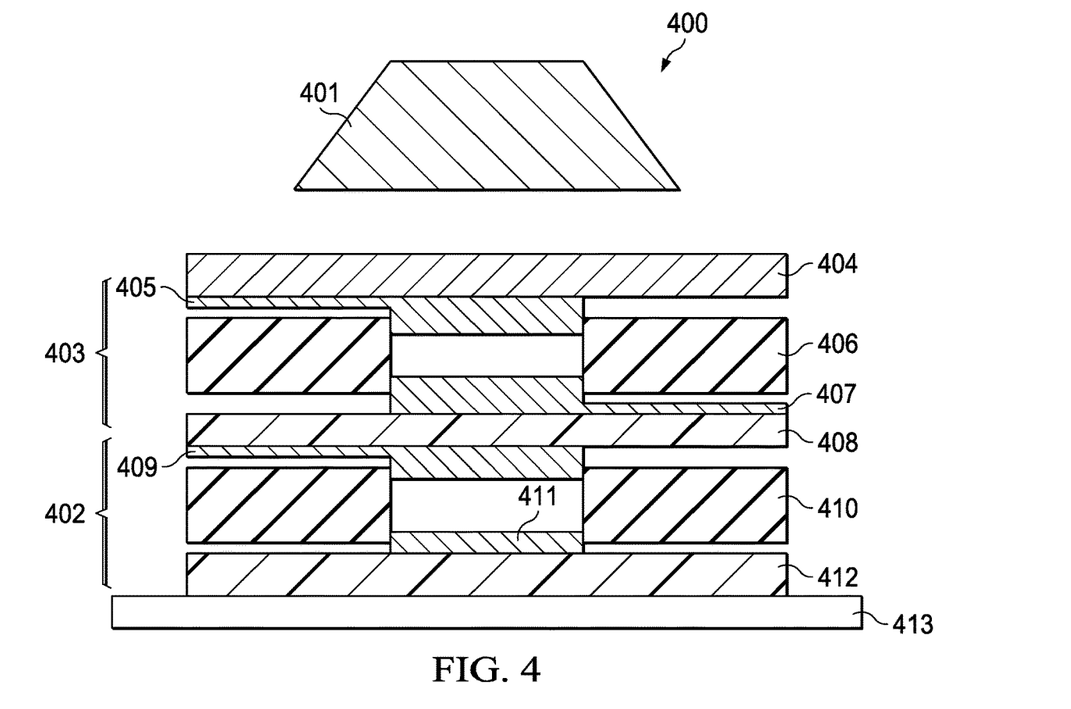
FIG. 4 is a cross-section view of an example of a first hack-proof security keyboard implementation according to some embodiments.

FIG. 4 is a cross-section view of an example of a first hack-proof security keyboard implementation 400. In this embodiment, key cap 401 implements one of keys 301A-C, primary membrane 402 implements primary layer 302, and secondary membrane 403 implements secondary layer 303.

Primary membrane 402 includes row trace 409 (e.g., $R_{A-C}$), column trace 411 (e.g., $C_{A-C}$), and membrane spacers 410. Primary membrane 402 is sandwiched between insulating layers 408 and 412, and it is assembled overlaying metal plate 413. Secondary membrane includes input trace 405 and output trace 407, as well as spacing layer 406.

Keycap 401 is mechanically coupled to secondary and primary membranes 402 and 403 via flexible intermediate layer 404 (e.g., silicone), such that, when pressed downward, it closes the portion of the loop circuit between input trace 405 and output trace 407; in addition to and/or independently of closing the matrix circuit between row trace 409 and column trace 411.

Figure 5:
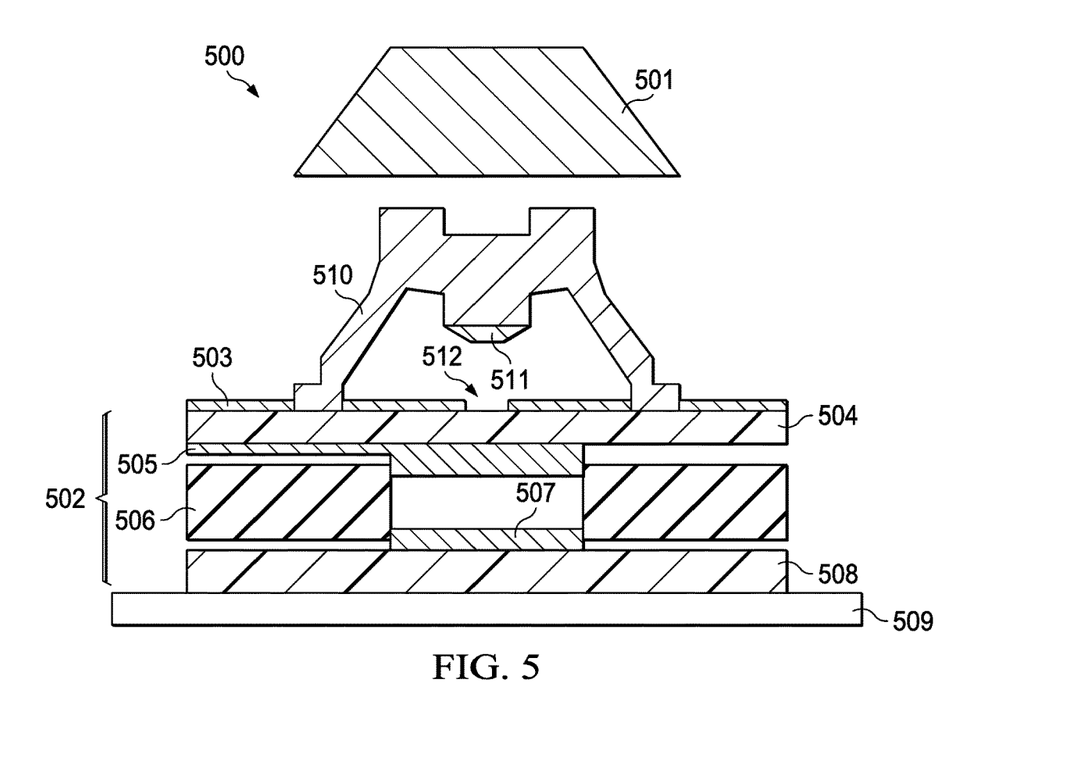
FIG. 5 is a cross-section view of an example of a second hack-proof security keyboard implementation according to some embodiments.

FIG. 5 is a cross-section view of an example of a second hack-proof security keyboard implementation 500. In this embodiment, key cap 501 implements one of keys 301A-C, and primary membrane 502 implements primary layer 302. As described above, primary membrane 502 also includes row trace 505 (e.g., $R_{A-C}$), column trace 507 (e.g., $C_{A-C}$), and membrane spacers 506; and it is sandwiched between insulating layers 504 and 508, overlying metal plate 509. In contrast with module 400, however, in module 500 secondary layer 503 may be implemented using a single-layer trace. In some cases, the single-layer trace may include a silver trace portion and a carbon trace portion overlying the silver trace portion. The carbon portion may be configured to protect the silver portion from wear-and-tear resulting from repeated key activation throughout the useful life of the product.

Keycap 501 is mechanically coupled to primary membrane 502 and secondary layer 503 via mechanisms and is position directly above rubber dome 510. Rubber dome 510 includes a conductive patch on boss surface 511, such that, when pressed downward, it closes gap 512 of single-layer silver trace 503 (thus making it conductive); in addition to and/or independently of closing the matrix circuit between row trace 505 and column trace 507. In various embodiments, dome 511 may be a carbon-tipped rubber dome, or the like.

Although implementations 400 and 500 show the use of one primary membrane (with a matrix circuit) and one secondary layer or membrane (with a loop circuit), it should be noted that any number of secondary membranes may be used. For example, a first secondary membrane or trace layer may include a first loop circuit configured to detect concurrent operation of a first subset of keys, whereas a second secondary membrane or trace layer overlying the first secondary membrane may include a second loop circuit configured to detect concurrent activation of a second subset of keys; and the first and second secondary membranes may operate in parallel or independently of each other (e.g., each different secondary membrane configured to detect a distinct keystroke combination).

Additionally, or alternatively, two or more distinct loop circuits may be used in the same secondary layer or membrane to enable concurrent activation of a different subsets of keys corresponding to distinct keystroke combinations.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A keyboard module, comprising:
   a first circuit configured to detect activation of a plurality of keys; and
   a second circuit configured to detect activation of a subset of the plurality of keys to the exclusion of at least one key of the plurality of keys, wherein the second circuit overlies the first circuit.

2. The keyboard module of claim 1, wherein the first circuit comprises a row trace layer, a column trace layer, and a spacing layer between the row trace layer and the column trace layer.

3. The keyboard module of claim 2, wherein the first circuit is coupled to a metal plate via a first insulating layer, and wherein the second circuit is coupled to the first circuit via a second insulating layer.

4. The keyboard module of claim 3, wherein the second circuit comprises an input trace layer, an output trace layer, and another spacing layer between the input trace layer and the output trace layer.

5. The keyboard module of claim 3, wherein the second circuit comprises a single conductive trace layer.

6. The keyboard module of claim 5, wherein the single conductive trace layer further comprises a silver trace portion and a carbon trace portion overlying the silver trace portion.

7. The keyboard module of claim 6, wherein the single conductive trace layer forms a gap under each key of the subset of keys, and wherein each of the subset of keys comprises a conductive dome configured to close a corresponding gap.

8. The keyboard module of claim 7, wherein the conductive dome is a carbon dome.

9. The keyboard module of claim 1, wherein the second circuit couples each of a plurality of electrical switches in series, wherein each one of the plurality of switches corresponds to one key of the subset keys, and wherein concurrent activation of the subset of keys causes the second circuit to output a selected electrical signal.

10. The keyboard module of claim 9, wherein the selected electrical signal is configured to cause a reset or recovery operation of an Information Handling System (IHS) independently of any keystroke detection by the first circuit.

11. The keyboard module of claim 9, further comprising a third circuit configured to detect activation of another subset of the plurality of keys, wherein the third circuit overlies the first or second matrices, wherein the third circuit couples each of another plurality of electrical switches in series with respect to each other, and wherein concurrent activation of the other subset of keys causes the third circuit to output another electrical signal independently of any keystroke detection by any of the first or second matrices.

12. An Information Handling System (IHS), comprising:
 a processor;
 an embedded controller coupled to the processor; and
 a keyboard coupled to the embedded controller, the keyboard comprising:
  a plurality of keys;
  a primary membrane configured to detect activation of any of the plurality of keys; and
  a secondary membrane configured to detect concurrent activation of a subset of the plurality of keys to the exclusion of at least one key of the plurality of keys.

13. The IHS of claim 12, wherein the primary membrane comprises a row trace layer, a column trace layer, and a spacing layer between the row trace layer and the column trace layer.

14. The IHS of claim 13, wherein the secondary membrane comprises a conductive trace layer having a respective gap under each key of the subset of keys, and wherein each of the subset of keys comprises a conductive dome.

15. The IHS of claim 14, wherein the conductive trace layer comprises a silver trace portion and a carbon trace portion overlying the silver trace portion, and wherein the conductive dome is a carbon dome.

16. The IHS of claim 12, wherein the secondary membrane couples each of a plurality of electrical switches in series, wherein each one of the plurality of switches corresponds to one key of the subset keys, and wherein concurrent activation of the subset of keys causes the secondary membrane to output an electrical signal.

17. The IHS of claim 16, wherein the electrical signal triggers a predefined operation.

18. A method, comprising:
 detecting an electrical signal received from a secondary membrane of a keyboard, wherein the keyboard comprises a primary membrane configured to detect individual activation of any of a plurality of keys, and wherein the secondary membrane is configured to output the electrical signal in response to concurrent activation of a subset of the plurality of keys to the exclusion of at least one key of the plurality of keys; and
 performing a selected action in response to the detection.

19. The method of claim 18, wherein the selected action comprises a hardware reset operation.

20. The method of claim 18, wherein the selected action comprises a software recovery operation.

* * * * *